US012657879B2

(12) United States Patent　　(10) Patent No.:　US 12,657,879 B2
Song et al.　　(45) Date of Patent: 　Jun. 16, 2026

(54) MULTI-DIMENSIONAL IMAGE STYLIZATION USING TRANSFER LEARNING

(71) Applicant: Lemon Inc., Grand Cayman (KY)

(72) Inventors: Guoxian Song, Los Angeles, CA (US); Hongyi Xu, Los Angeles, CA (US); Jing Liu, Los Angeles, CA (US); Tiancheng Zhi, Los Angeles, CA (US); Yichun Shi, Los Angeles, CA (US); Jianfeng Zhang, Singapore (SG); Zihang Jiang, Singapore (SG); Jiashi Feng, Singapore (SG); Shen Sang, Los Angeles, CA (US); Linjie Luo, Los Angeles, CA (US)

( * ) Notice: Subject to any disclaimer, the term of this patent is extended or adjusted under 35 U.S.C. 154(b) by 657 days.

(21) Appl. No.: 18/168,867

(22) Filed: Feb. 14, 2023

(65) Prior Publication Data

US 2024/0273871 A1 　 Aug. 15, 2024

(51) Int. Cl.
　　*G06V 10/77* 　　　(2022.01)
　　*G06V 10/28* 　　　(2022.01)
　　*G06V 10/44* 　　　(2022.01)
(52) U.S. Cl.
　　CPC .......... *G06V 10/7715* (2022.01); *G06V 10/28* (2022.01); *G06V 10/454* (2022.01)
(58) Field of Classification Search
　　CPC .. G06V 10/7715; G06V 10/28; G06V 10/454; G06T 19/20; G06T 17/10; G06T 2219/2012; G06T 2219/2024; G06N 3/0475; G06N 3/096
　　See application file for complete search history.

(56) References Cited

U.S. PATENT DOCUMENTS

| | | | | |
|---|---|---|---|---|
| 11,170,270 | B2 * | 11/2021 | Merler | .................. G06N 20/00 |
| 2021/0049468 | A1 * | 2/2021 | Karras | ................. G06N 3/0495 |
| 2021/0150769 | A1 * | 5/2021 | Babaheidarian | ....... H04N 19/13 |
| 2021/0382936 | A1 * | 12/2021 | Tomar | ................. G06F 16/5854 |

OTHER PUBLICATIONS

Chan Efficient Geometry-aware 3D Generative Adversarial Networks (Year: 2022).*

(Continued)

*Primary Examiner* — Andrew M Moyer
*Assistant Examiner* — Ahmed A Nasher
(74) *Attorney, Agent, or Firm* — Fish & Richardson P.C.

(57) ABSTRACT

A method for generating a multi-dimensional stylized image. The method includes providing input data into a latent space for a style conditioned multi-dimensional generator of a multi-dimensional generative model and generating the multi-dimensional stylized image from the input data by the style conditioned multi-dimensional generator. The method further includes synthesizing content for the multi-dimensional stylized image using a latent code and corresponding camera pose from the latent space to formulate an intermediate code to modulate synthesis convolution layers to generate feature images as multi-planar representations and synthesizing stylized feature images of the feature images for generating the multi-dimensional stylized image of the input data. The style conditioned multi-dimensional generator is tuned using a guided transfer learning process using a style prior generator.

19 Claims, 7 Drawing Sheets

100

120

110　130　135　140　150　160

$E_\theta$　W

W+ space p
Camera
pose 112　　　　152

(56)         References Cited

OTHER PUBLICATIONS

Song AgileGAN: Stylizing Portraits by Inversion-Consistent Transfer Learning (Year: 2021).*

Shwarz GRAF: Generative Radiance Fields for 3D-Aware Image Synthesis (Year: 2021).*

Chen et al.,"Efficient Geometry-aware 3D Generative Adversarial Networks", Computer Science, Computer Vision and Pattern Recognition, arXiv:2112.07945, retrieved online from: https://arxiv.org/abs/2112.07945; Submitted on Dec. 15, 2021 (v1), last revised Apr. 27, 2022.

Chong et al.,"JoJoGAN: One Shot Face Stylization", Computer Science, Computer Vision and Pattern Recognition, retrieved online from: https://arxiv.org/abs/2112.11641; Submitted on Dec. 22, 2021 (v1), last revised Mar. 6, 2022.

Deng et al.,"ArcFace: Additive Angular Margin Loss for Deep Face Recognition", Computer Science, Computer Vision and Pattern Recognition, retrieved online from: https://arxiv.org/abs/1801.07698; Submitted on Jan. 23, 2018 (v1), last revised Sep. 4, 2022.

Gu et al.,"StyleNeRF: A Style-based 3D-Aware Generator for High-resolution Image Synthesis", Computer Science, Computer Vision and Pattern Recognition, retrieved online from: https://arxiv.org/abs/2110.08985; Submitted on Oct. 18, 2021.

Huang et al.,"Unsupervised Image-to-Image Translation via Pre-trained StyleGAN2 Network", Computer Science, Computer Vision and Pattern Recognition, retrieved online from: https://www.semanticscholar.org/reader/084368bcfe786de94a19e6da08255eb5ffdba152; Submitted on Oct. 12, 2020 (v1), last revised Oct. 27, 2020.

Karras et al.,"Analyzing and Improving the Image Quality of StyleGAN", Computer Science, Computer Vision and Pattern Recognition, retrieved online from; https://arxiv.org/abs/1912.04958; Submitted on Dec. 3, 2019 (v1), last revised Mar. 23, 2020.

Or-El et al.,"StyleSDF: High-Resolution 3D-Consistent Image and Geometry Generation", Computer Science, Computer Vision and Pattern Recognition, retrieved online from: https://arxiv.org/abs/2112.11427; Submitted on Dec. 21, 2021 (v1), last revised Mar. 30, 2022.

Pinkney et al.,"Resolution Dependent GAN Interpolation for Controllable Image Synthesis Between Domains", Computer Science, Computer Vision and Pattern Recognition, retrieved online from: https://arxiv.org/abs/2010.05334; Submitted on Oct. 11, 2020 (v1), last revised Nov. 21, 2020.

Song et al.,"AgileGAN: stylizing portraits by inversion-consistent transfer learning", ACM Journals, ACM Transactions on Graphics, vol. 37, No. 4, Article 111, accessed online from: https://guoxiansong.github.io/homepage/paper/AgileGAN.pdf; Published Aug. 2021.

Tov et al.,"Designing an Encoder for StyleGAN Image Manipulation", Computer Science, Computer Vision and Pattern Recognition, accessed online from: https://arxiv.org/abs/2102.02766; Submitted on Feb. 4, 2021.

Xu et al.,"Deep 3D Portrait from a Single Image", Computer Science, Computer Vision and Pattern Recognition, accessed online from: https://arxiv.org/pdf/2004.11598.pdf; Submitted on Apr. 24, 2020.

Yang et al.,"Pastiche Master: Exemplar-Based High-Resolution Portrait Style Transfer", Computer Science, Computer Vision and Pattern Recognition, accessed online from: https://arxiv.org/abs/2203.13248; Submitted on Mar. 24, 2022.

Zhang et al.,"The Unreasonable Effectiveness of Deep Features as a Perceptual Metric", Computer Science, Computer Vision and Pattern Recognition, accessed online from: https://arxiv.org/abs/1801.03924; Submitted on Jan. 11, 2018 (v1), last revised Apr. 10, 2018.

* cited by examiner

500

MULTI-DIMENSIONAL IMAGE STYLIZATION USING TRANSFER LEARNING

FIELD

The embodiments described herein pertain generally to multi-dimensional image synthesis in computer vision and graphics. More specifically, the embodiments described herein pertain to generating multi-dimensional stylized images using a multi-dimensional generative adversarial network (GAN) conditioned using transfer learning.

BACKGROUND

Portraiture or stylized portraits has evolved into more expressive interpretations with a plethora of styles or stylizations, such as abstract art, cubism and cartoon. Prior approaches, however, are limited to stylized portraits in a two-dimensional image space or providing three-dimensional images that are less personalized with respect to an input image. For example, when creating three-dimensional images, a large number of high quality three-dimensional image data sets are necessary, but even with the large number of image data that is used, it is very difficult to capture the diversities in real world appearances given only a few hundred assets and a base morphable three-dimensional face model. As such, such prior three-dimensional approach usually generates less personalized results, e.g., user similarity. Additionally, while a pre-trained three-dimensional generator may be directly conditioned with a few shot sample exemplars, such direct conditioning of the three-dimensional generator generates poorly in both perceptual quality and user similarity and/or require a large number of style exemplars in a multitude of camera poses, e.g., adequate style visual supervisions with well estimated camera labels. Moreover, while some generative models, such as StyleGAN2® latent diffusion models, may be used to produce highly diversified images that are highly personalized portraits of the input image, such generative models are primarily modeled in the two-dimensional image space.

SUMMARY

Features in the embodiments disclosed herein provide a multi-dimensional generative model that may synthesize multi-dimensional stylized images, e.g., three-dimensional stylized portraits, with a single-view image, e.g., single selfie or self-portrait. By using transfer learning, the multi-dimensional generative model described herein may generate multi-dimensional stylized images with detailed geometry in which new stylizations may be achieved with only a few unpaired style exemplars. In an embodiment, the transfer learning process uses a style prior generator to train, condition, and/or tune the multi-dimensional generative model to synthesize multi-view consistent stylized images in a wide range of artistic styles, e.g., stylizations.

As such, the multi-dimensional generative model is provided such that three-dimensional stylized images, e.g., portraits, with detailed geometry may be synthesized given only a single user photo as input data in which a new stylization may be achieved with only a few unpaired style exemplars, e.g., 20 exemplars. Additionally, the multi-dimensional generative model may provide a simple yet efficient way to fine-tune a pre-trained three-dimensional generative adversarial network (GAN) by using a style prior creation stage to improve data diversity which may be combined with guided transfer learning to increase the stylization domain coverage. Further, the multi-dimensional generative model may be trained such that the encoder is configured to invert the input data, e.g., real face image, into the corresponding latent space and trained with cycle consistent loss to improve identity preservation while achieving high stylization quality.

In one example embodiment, a method for generating a multi-dimensional stylized image is provided. The method includes providing input data into a latent space for a style conditioned multi-dimensional generator of a multi-dimensional generative model and generating the multi-dimensional stylized image from the input data by the style conditioned multi-dimensional generator. The generating may include synthesizing content for the multi-dimensional stylized image using a latent code and corresponding camera pose from the latent space to formulate an intermediate code to modulate synthesis convolution layers to generate feature images as multi-planar representations and synthesizing stylized feature images of the feature images for generating the multi-dimensional stylized image of the input data. The style conditioned multi-dimensional generator is tuned using a guided transfer learning process using a style prior generator. The multi-dimensional generative model described herein may synthesize multi-view consistent stylized portraits from a single user photo, in which new stylizations may be achieved with only a few unpaired two-dimensional style exemplars.

In another example embodiment, a multi-dimensional generative adversarial network (GAN) is provided. The GAN includes an encoder for inverting input data into a latent space; a style conditioned multi-dimensional generator; and a style prior generator. The style conditioned multi-dimensional generator is configured to synthesize content for a multi-dimensional stylized image using a latent code and corresponding camera pose from the latent space to formulate an intermediate code to modulate synthesis convolution layers to generate feature images as multi-planar representations and synthesize stylized feature images of the feature images as the multi-planar representations to generate the multi-dimensional stylized image of the input data. Additionally, the style conditioned multi-dimensional generator is tuned using a guided transfer learning process using the style prior generator.

In yet another example embodiment, a non-transitory computer-readable medium having computer-executable instructions stored thereon that, upon execution, cause one or more processors to perform operations including providing input data into a latent space for a style conditioned multi-dimensional generator of a multi-dimensional generative model and generating the multi-dimensional stylized image from the input data by the style conditioned multi-dimensional generator. The generating includes synthesizing content for the multi-dimensional stylized image using a latent code and corresponding camera pose from the latent space to formulate an intermediate code to modulate synthesis convolution layers to generate feature images as multi-planar representations and synthesizing stylized feature images of the feature images for generating the multi-dimensional stylized image of the input data. Additionally, the style conditioned multi-dimensional generator is tuned using a guided transfer learning process using a style prior generator.

The multi-dimensional generative model disclosed herein may, thus, support several downstream applications, including, but not limited to, three-dimensional printed postcards, dynamic profile pictures, e.g., changing views in different viewing angles or lighting directions, and personalized three-dimensional content in augmented and/or virtual reality.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
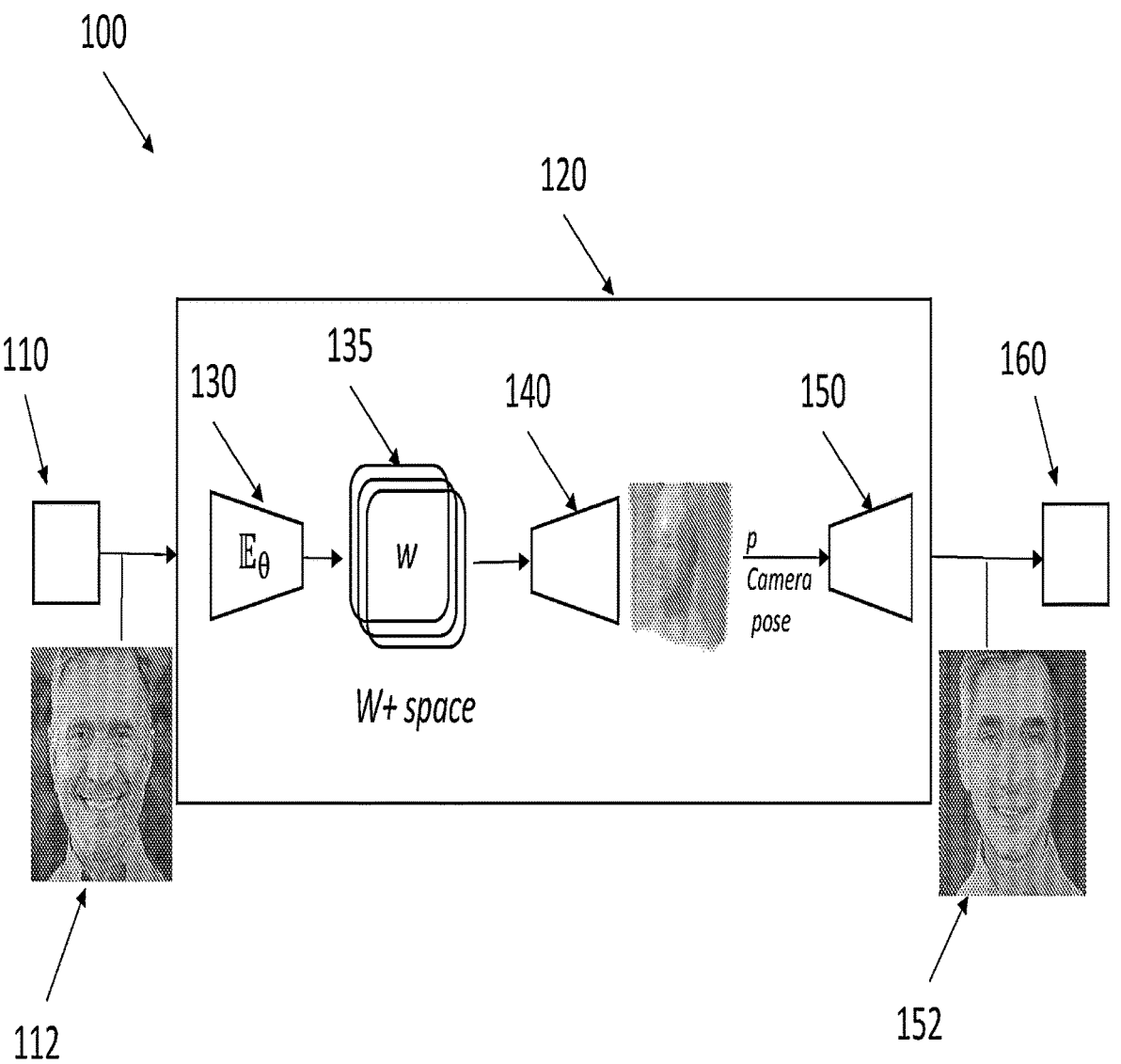
FIG. 1 illustrates an example multi-dimensional model for generating multi-dimensional stylized images that may be implemented, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, "latent code" (e.g., latent code z, etc.) in a latent space may refer to a vector containing random values sampled from a Gaussian (normal) distribution and/or Gaussian noise. It is to be appreciated that "latent space" may refer to a simpler (e.g., lower-dimensional, etc.), hidden representation of a data point.

As referenced herein, "latent features," in accordance with computer vision and image processing, may refer to feature vectors extracted from an image, e.g., a 2D portrait image or monocular video. The feature vectors may be extracted by an encoder of a generative model, i.e., features that are extracted from an input dataset that correspond to any one of the input captions, e.g., classifications, or by the generative model itself.

As referenced herein, "latent space" may refer to a latent feature space or embedding space in which items resembling each other more closely are positioned close to one another. In a non-limiting example, the latent space may be a W latent space which may be a 1×512 space, a Z latent space which may be from a normal Gaussian distribution, or a W+ latent space which may be a concatenation of 17 or 18 different 512 dimensional w vectors.

As referenced herein, "camera pose" may refer to the position and orientation of a camera in a coordinate system, with respect to six degrees of freedom, using different representations, e.g., a transformation matrix. It is to be appreciated that the six degrees of freedom may be grouped into two categories: translations and rotations. Translations are linear, horizontal straightness, and vertical straightness. Rotations are pitch, yaw, and roll. Camera pose may include the estimation of objects' poses in scenes or scenarios for the camera. In an example, embodiment, camera pose may be estimated from training images from an image dataset, e.g., using a camera pose estimator.

As referenced herein, a "generative adversarial network" or "GAN" may refer to an algorithmic architecture that uses two neural networks, pitting one against the other (thus "adversarial") in order to generate new, synthetic instances of data that can pass for real data. GANs are typically used in image generation, video generation, or the like. It is to be understood that a GAN may include a multi-dimensional generator that may refer to a deep machine learning-based framework or model that may be used to generate multi-dimensionally implicit neural representations that are modeled in a multi-dimensional space. The multi-dimensional generator may be configured to learn real data distribution to generate data closer to the distribution, e.g., real or plausible data, to fool a discriminator, e.g., by not minimizing distance via unsupervised learning, and a discriminator neural network that is configured to discriminate between the real and generated images, e.g., contest each other as a zero-sum game.

As referenced herein, "rendering" or "neural rendering" may refer to a class of deep image and video generation approaches that enable explicit or implicit control of scene properties such as illumination or lighting, camera parameters, pose, geometry, appearance, shapes, semantic structure, etc. It is to be understood that "rendering" or "neural rendering" may refer to a method, based on deep neural networks and physics engines, which can create novel images and video footage based on existing scenes. It is also to be understood that the functions of "rendering" or "neural rendering" may be implemented by a "renderer" or "neural renderer".

As referenced herein, "super resolution" imaging may refer to a class of techniques that enhance and/or increase the resolution of an imaging system. Image super resolution may refer to a task of enhancing the resolution of an image from low-resolution to high-resolution, or recovering high-resolution image(s) from low-resolution image(s). It is to be understood that the functions of "super resolution" may be implemented by a super resolution module. It is also to be understood that the output image of the super resolution module may refer to "super-resolved" image(s). It is also to be understood that "super resolution" may include one of more of different "up-sampling" processes.

As referenced herein, "up-sample" or "up-sampling" may refer to an image-editing action or process that enlarges the original image, making up (or interpolating) additional pixels to fill in the gaps. "Up-sampling" may refer to the increasing of the spatial resolution while keeping the two-dimensional representation of an image. It is to be understood that up-sampling may be used for zooming in on a small region of an image, and for eliminating the pixelation effect that arises when a low-resolution image is displayed on a relatively large frame.

As referenced herein, "style exemplars" are representative two-dimensional images of a given or desired artistic style or stylization. For example, the artistic style or stylization may include, but not limited to, cartoon, oil painting, cubism, abstract, comic, Sam Yang, sculpture, anime, etc.

As referenced herein, "multilayer perceptron" or "MLP" may refer to a feedforward artificial neural network that may generate a set of outputs from a set of inputs. It is to be understood that an MLP may be characterized by several layers of input nodes connected as a directed graph between the input and output layers.

As referenced herein, "discriminator" may refer to a classifier that distinguishes real data from the data created by the generator. It is to be understood that a discriminator classifies both real data and fake data from the generator, and may use any network architecture appropriate to the type of data the discriminator is classifying. It is also to be understood that the discriminator may determine whether the input samples are real or fake. The input samples may be real samples coming from the training data, or fake coming from the generator.

As referenced herein, "mapping network" may refer to a function or algorithm that may embed an input latent code to intermediate latent space which may be used as a style and may be incorporated at each block of a synthesis network.

As referenced herein, a model or framework may refer to software, i.e., algorithms and/or programs, hardware or firmware, or any combination thereof that supports machine learning, natural language understanding, natural language processing, speech recognition, computer vision, etc.

As referenced herein, "tri-plane" representation may refer to a feature representation that combines an explicit backbone, which produces features aligned on three orthogonal planes, with a small implicit decoder. In an example embodiment, StyleGAN2® or other suitable generative model may be used as the backbone so that the qualities of the backbone, including a well-behaved latent space, may be inherited.

With the features in the embodiments disclosed herein, a multi-dimensional generative model is provided that uses style prior creation to leverage existing two-dimensional portrait stylization capabilities to train, condition, and/or tune the style conditioned multi-dimensional generator using transfer learning to generate multi-dimensional stylized images. As discussed herein, while not intending to limit the scope of the disclosure, the multi-dimensional generative model may be a three-dimensional model for generating a three-dimensional stylized portrait of an input data, e.g., self-portrait or selfie. The "multi-dimensional" nature of the model, however, may also include additional dimensions, for example, time, in which the guided transfer learning process may be used to train, condition, and/or tune a multi-dimensional generator having a time component, which may also be used for the training of the encoder for inversion, e.g., for stylized video generation. For sake of clarity, the multi-dimensional generative model is described below as a three-dimensional generative model and the multi-dimensional stylized image is described below as a three-dimensional stylized portrait.

In an example embodiment, the three-dimensional generative model may include a two-dimensional portrait stylization module or framework, e.g., AgileGAN, that may be used to obtain a large number of stylized portraits using real face photos as inputs. As such, not only are paired data between stylized faces and real faces obtained, but also, fairly accurate head pose estimations of generated stylized portraits may be determined, e.g., by reusing the poses estimated from the corresponding real faces for camera pose estimation. Moreover, the two-dimensional portrait stylization module may be used in the transferring learning process to provide a guided transfer learning step with a reconstruction loss to help improve the three-dimensional stylization for out-of-domain samples, e.g., areas in the image that are not provided. Furthermore, an encoder, e.g., a three-dimensional GAN encoder, may be used to embed an input image into an enlarged latent space, e.g., W latent space, for better identity-preserved three-dimensional stylization. A cycle consistency loss may be used in the encoder training to further improve the multi-view reconstruction fidelity. As such, a three-dimensional generative model is provided that is able to synthesize multi-view consistent stylized three-dimensional portraits in a wide range of artistic styles given a single input and few style exemplars.

FIG. 1 illustrates an example system 100 in which a three-dimensional generative model 120, e.g., a GAN or an efficient geometry-aware GAN, that generates high quality stylized three-dimensional portraits may be implemented, arranged in accordance with at least some embodiments described herein. Once the three-dimensional generative model 120 has been trained, conditioned, and/or tuned, the model 120 may be deployed for inference. In an example embodiment, the three-dimensional generative model 120 may be a function, an operation, an action, an algorithm, an application, or the like that is implemented, designed, stored, executed, performed, or otherwise hosted in an electronic device (e.g., 700 of FIG. 7, etc.) such as a graphics processing unit ("GPU"), central processing unit ("CPU"), or other processor-enabled device, which may be a cloud-based network, a local device, or downloaded to the local device, a server, a smartphone, a tablet computer, a laptop computer, a desk computer, and/or any other suitable electronic device. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

The system 100 may include a source 110 and the three-dimensional generative model 120. In an example embodiment, the source 110 may be an electronic device (e.g., 700 of FIG. 7, etc.) including but not limited to a camera, a video recorder, a smartphone, a tablet computer, a laptop computer, a desk computer, and/or any other suitable electronic device. In another example embodiment, the input source 110 may be storage, a database, a file, or the like. The input source 110 may provide input data 112 to the three-dimensional generative model 120. In an example embodiment, the input data 112 may include a text, an image, a video, a latent code, a camera pose, etc. that is captured, generated, obtained, user-entered, etc. via the source 110 or that is stored in the source 110.

The three-dimensional generative model 120 may include an encoder 130, a latent space 135, a style conditioned multi-dimensional generator (referred to herein as a three-dimensional generator) 140, and a decoder 150. In an example embodiment, the three-dimensional generative model 120 may receive input data 112 from the source 110, generate three-dimensional stylized image(s) 152 based on the received input 112, and/or be trained, tuned, or conditioned to generate image(s) 152 based on the received input 112, as discussed below. The generated image(s) 152 may be stored in an output device 160, including, but not limited to a storage device, displayed in an output/display device, and/or sent to an electronic device.

In an example embodiment, the encoder 130 may refer to one or more components or modules that are designed, programmed, or otherwise configured to receive input data 112 that may include an image, for example, a self-portrait image or selfie. In a non-limiting example, the encoder 130 may be designed, programmed, or otherwise trained to iteratively extract, from the input data 112, using encoded latent codes, feature vectors corresponding to latent features into the latent space 135, in accordance with encoding technologies, i.e., extracted or mapped into the latent space 135, as discussed further below. Non-limiting examples of extracted features may include surfaces, gender, skin color, lighting, coloring, identities, animals, objects, edges, points, boundaries, curves, shapes, etc.

In an example embodiment, the style conditioned three-dimensional generator 140 may include a generator neural network for generating raw images of the stylized images. The style conditioned three-dimensional generator 140 may include functions, operations, actions, algorithms, an application, or the like. The style conditioned three-dimensional generator 140 may be configured to receive the feature vectors and/or the latent features of the input data 112 from the latent space 135 and generate style conditioned three-dimensional representations, e.g., stylized three-dimensional representations of the input data in a tri-plane or multi-grid space. In an embodiment, the style conditioned three-dimensional generator 140 may take the learned latent codes z, e.g., from a standard Gaussian distribution, that determines the geometry and appearance of the input data, and camera poses p corresponding to the latent code to synthesize the style conditioned three-dimensional representations. In an embodiment, the latent code z and the camera pose p may be passed though a mapping network, e.g., a multi-layer perceptron, to obtain an intermediate latent code w, which may be inputted and duplicated multiple times by the style conditioned three-dimensional generator 140 to modulate synthesis convolution layers to produce the stylized three-dimensional features, e.g., mapped in a tri-plane or the like.

In an example embodiment, the decoder 150 may be configured to synthesize the raw feature images from the style conditioned three-dimensional generator 140 to synthesize the final multi-view consistent three-dimensional stylized portrait of the input data, e.g., including color, e.g., RGB. The decoder 150 may include functions, operations, actions, algorithms, an application, or the like. The decoder 150 may include a volume rendering module configured to transform synthesized images from the style conditioned three-dimensional generator 140 into a three-dimensional view, a super resolution module configured to synthesize the final RGB image by enhancing and/or increasing the resolution of the image, and/or an up-sampling module configured to process or enhance the original image to increase the spatial resolution of the image. In an embodiment, the up-sampling module may be a part of the super resolution module.

It is to be understood that the three-dimensional generative model 120 may enable a generative model for creating three-dimensional stylized portraits with detailed geometry from a single input data 112, e.g., self-portrait or selfie. The stylization may include, but not limited to, cartoon, oil painting, cubism, abstract, comic, famous people, Sam Yang, sculpture, anime, or the like. The three-dimensional generative model 120 may be fine-tuned, conditioned, or trained via a guided transfer learning process to increase the stylization domain coverage. The guided transfer learning process may include using a style prior generator to improve data diversity. Such guided transfer learning is a less complicated process then a process that directly uses stylized exemplars for fine-tuning a three-dimensional generator, at least because two-dimensional stylized images are used for the transfer learning process and because camera pose for a given input, e.g., a known camera pose, may not be needed for the stylization, e.g., directly input into the three-dimensional generator. Additionally, the three-dimensional generative model 120 may be tuned such that the encoder is configured to invert the input data 112, e.g., real face images, into a corresponding latent space, trained with cycle consistent loss to improve identity preservation, while achieving high stylization quality. The details of the three-dimensional generative model are discussed further below.

In order for the three-dimensional generative model 120 to generate three-dimensional stylized portraits, not only may the three-dimensional generative model 120 need to be trained to produce geometry-aware three-dimensional representations of the input data, e.g., using a three-dimensional efficient geometry-aware generative adversarial network, such as EG3D, but also may be trained, conditioned, and/or tuned for the given stylization, e.g., cartoon, anime, oil painting, etc. As such, the training, conditioning, and/or tuning of the three-dimensional generative model 120 may include one or more of the following three stages: style prior creation, three-dimensional inversion, and guided style transfer learning, as discussed herein.

Figure 2:
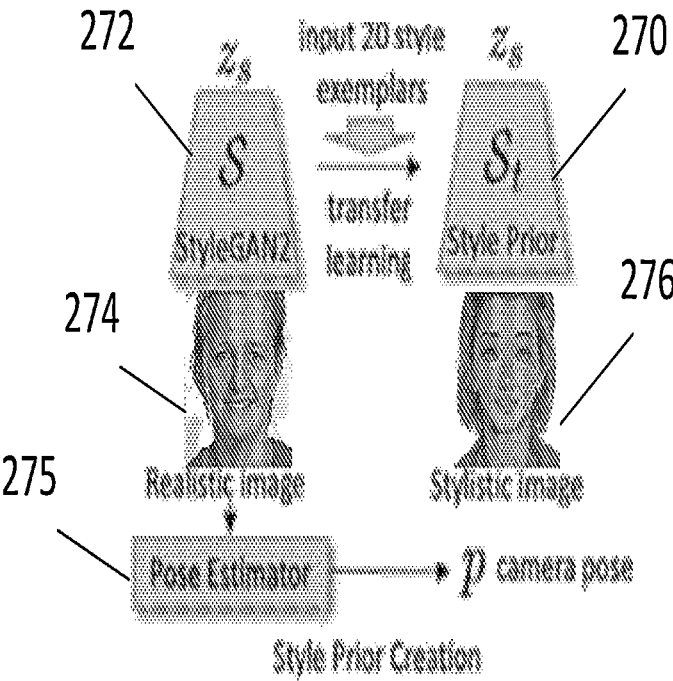
FIG. 2 illustrates an example style prior creation stage, arranged in accordance with at least some embodiments described herein.

FIG. 2 illustrates an example system for the style prior creation stage that may be implemented, arranged in accordance with at least some embodiments described herein. It is appreciated that while prior processes for three-dimensional portrait stylization fine-tuned a pre-trained three-dimensional generator directly with a few style samples, such training resulted in poorly generated images having both low perceptual quality and user similarity, e.g., likeness. Without wishing to be bound by theory, the problem of poor quality and user similarity may be rooted in insufficient style examples in the three-dimensional space and inaccurate camera pose estimation. For the style prior creation, as discussed herein, however, instead of directly using given stylized exemplars to fine-tune the three-dimensional generator of the three-dimensional generative model, the style prior creation stage uses a transfer learning process to train, condition, or fine-tune a two-dimensional generator using a predetermined amount of style exemplars, which is then used to guide the transfer learning of the three-dimensional generator. The style exemplars may be the desired stylization including, but not limited to, an artistic style such as, cartoon, oil painting, cubism, abstract, comic, Sam Yang, sculpture, or the like.

As seen in FIG. 2, in an example embodiment, the training, conditioning, and/or tuning of the three-dimensional generative model (e.g., 120) may start at the style prior creation stage by training, conditioning, and/or tuning a style prior generator 270. The style prior generator 270 may be based on a generative adversarial network (GAN) 272 that is enhanced with a multi-path structure to better adapt to different stylization features. The GAN 272 may be pre-trained on high-resolution real portraits, such that the GAN 272 may be set having initialization weights to form realistic images 274.

In an example embodiment, the style prior generator 270 may be trained, conditioned, and/or tuned using a transfer learning process that is used to train, condition, and/or tune a two-dimensional GAN 272, e.g., StyleGAN2®, using a predetermined amount of style exemplars, e.g., 10, 15, 20, 25, 30, 35, or 40, having the desired stylization. For example, the stylizations from the style exemplars may be synthesized by directly up-sampling feature maps into images via several convolution layers. Since the two-dimensional GAN 272 may have initially been configured as a pre-trained model for generating realistic images 274, e.g., trained on two-dimensional images, by having the stylizations, e.g., as feature maps, the two-dimensional GAN 272 may then be trained, conditioned, and/or tuned to generate two-dimensional stylized images 276.

As such, the transfer learning process may be used to train or condition the two-dimensional GAN 272 into a style prior generator 270 with a few shot style exemplars. Such trained style prior generator 270 may be configured to generate synthesized stylized two-dimensional images of widely accessible real portrait images, e.g., using the latent code(s), and is also allows the pairing of the stylized image with the real (or realistic) image such that camera pose labels may be obtained with a pose estimator 275, e.g., based on the camera pose from the real or realistic portrait image using a face recognition network or using facial landmarks. It is appreciated that while the training or conditioning of a two-dimensional GAN into a style prior generator is discussed herein, such disclosure is not intended to limit the scope of the style prior creation stage. For example, in an embodiment, the style prior generator 270 may be a distinct and separate generator from the two-dimensional GAN 272, in which the style prior generator 270 is created as a GAN using transfer learning from the predetermined amount of style exemplars and the two-dimensional GAN 272 is configured to generate the corresponding realistic images 274 to obtain camera pose. In other embodiment, the style prior generator 270 may be the same generator as the two-dimensional GAN 272, and configured such that different inputs, e.g., latent codes and/or style codes, e.g., based on the style exemplar(s), may be inputted into the generator to result in the generation of either a realistic image 274 or a stylized image 276.

The style prior creation stage provides a number of benefits. For example, the quality of the stylized images may be improved by being able to provide a near infinite amount of stylized examples for fine-tuning the cross-domain three-dimensional generation of neural radiance features, e.g., by the three-dimensional generator which requires more style sample than two-dimensional GAN-based models. Additionally, the style prior creation stage provides better estimations of camera pose, especially for certain artistic styles, e.g., abstract, cubism, etc., in which direct camera pose estimations from the input style exemplars might not be very accurate. For example, since the style prior generator 270 may be based on the two-dimensional GAN 272, a plurality of camera poses may be provided from the realistic image generated by the two-dimensional GAN 272. In so doing, the three-dimensional generative model (e.g., 120) may be trained by synthesizing images by first accumulating neural radiance features (based on predetermined camera poses) via volume rendering to a feature map and then relying on super resolution to obtain the final portrait image. Since both the volume rendering and dual discriminator require reliable estimation of camera parameters, which are not easy to accurately obtained from non-realistic style examples, the style prior creation stage provides the added benefit of providing a plurality of stylized examples and corresponding camera poses.

Figure 3:
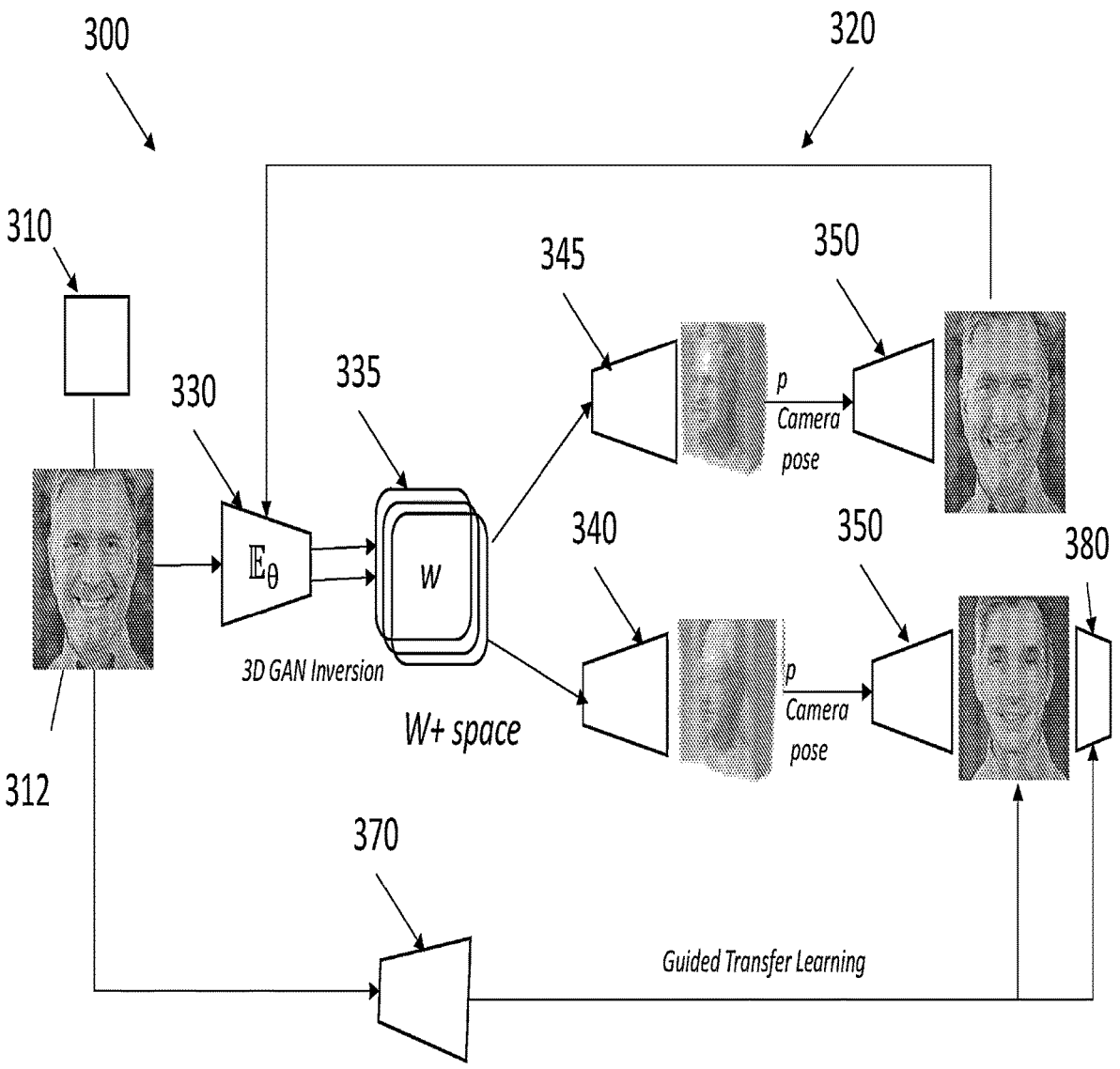
FIG. 3 illustrates training, conditioning, and/or tuning of an example multi-dimensional model that may be implemented, arranged in accordance with at least some embodiments described herein.

FIG. 3 illustrates an example system 300 having a three-dimensional generative model 320 for implementing the three-dimensional inversion training and guided style transfer learning for training, conditioning, and/or tuning a style conditioned three-dimensional generator in accordance with at least some embodiments described herein. In an example embodiment, the three-dimensional generative model 320 may be the three-dimensional generative model 120 of FIG. 1.

The three-dimensional generative model 320 may include an encoder 330, a latent space 335, a style conditioned three-dimensional generator 340, a three-dimensional generator 345, a decoder 350, a style prior generator 370, and a discriminator 380. In an example embodiment, the three-dimensional generative model 320 may be a function, an operation, an action, an algorithm, an application, or the like that is implemented, designed, stored, executed, performed, or otherwise hosted in an electronic device (e.g., 700 of FIG. 7, etc.) such as a graphics processing unit ("GPU"), central processing unit ("CPU"), or other processor-enabled device, which may be a cloud-based network, a local device, or downloaded to the local device, a server, a smartphone, a tablet computer, a laptop computer, a desk computer, and/or any other suitable electronic device. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

The encoder 330 may refer to one or more components or modules that are designed, programmed, or otherwise configured to receive input data 312 from input source 310 (or 110) that may include an image, for example, a self-portrait image or selfie. In a non-limiting example, the encoder 330 may be designed, programmed, or otherwise trained and configured to iteratively extract, from the input data 312, using encoded latent codes, feature vectors corresponding to latent features into the latent space 335, in accordance with encoding technologies, i.e., extracted or mapped into the latent space 335. Non-limiting examples of extracted features may include surfaces, gender, skin color, lighting, coloring, identities, motion, animals, objects, edges, points, boundaries, curves, shapes, etc.

In an example embodiment, the style conditioned three-dimensional generator 340 may include a generator neural network for multi-view consistent stylized image generation having a stylization. The style conditioned three-dimensional generator 340 may include functions, operations, actions, algorithms, an application, or the like. The style conditioned three-dimensional generator 340 may be configured to receive the feature vectors and/or the latent features of the input data 312 from the latent space 335 and generate style conditioned three-dimensional representations, e.g., raw feature images of the stylized three-dimensional representations of the input data. The style conditioned three-dimensional generator 340 may take the learned latent codes z, e.g., from a standard Gaussian distribution, that determines the geometry and appearance of the input data, and camera poses p corresponding to the latent code to synthesize the image. In an embodiment, the latent code z and the camera pose p may be passed though a mapping network, e.g., a multi-layer perceptron, to obtain an intermediate latent code w, which may be inputted and duplicated multiple times by the style conditioned three-dimensional generator 340 to modulate synthesis convolution layers to produce stylized three-dimensional features, e.g., the raw feature images of the stylized three-dimensional features mapped in a tri-plane.

The three-dimensional generator 345 may include a generator neural network for multi-view consistent image generation. The three-dimensional generator 345 may include functions, operations, actions, algorithms, an application, or the like. The three-dimensional generator 345 may be configured to receive the feature vectors and/or the latent features of the input data 312 from the latent space 335 and generate geometry-aware three-dimensional representations, e.g., raw images of the three-dimensional representations of the input data. The three-dimensional generator 345 may take learned latent codes z, e.g., from a standard Gaussian distribution or space, that determines the geometry and appearance of the input data, and camera poses p added to the latent code to synthesize an image. In an embodiment, the latent code z and the camera pose p̂ may be passed though a mapping network, e.g., a multi-layer perceptron, to obtain an intermediate latent code w, which may be inputted and duplicated multiple times by the three-dimensional generator 345 to modulate synthesis convolution layers to produce three-dimensional features, e.g., the raw images of the three-dimensional features mapped in a tri-plane. It is appreciated that while the style conditioned three-dimensional generator 340 and the three-dimensional generator 345 are discussed herein, such disclosure is not intended to limit the scope of the generator(s). For example, in an embodiment, the style conditioned three-dimensional generator 340 may be based on the three-dimensional generator 345, in which the three-dimensional generator 345 is trained, conditioned, and/or tuned to create the style conditioned three-dimensional generator 340. In other embodiment, the style conditioned three-dimensional generator 340 may be the same generator as the three-dimensional generator 345, and configured such that different inputs, e.g., latent codes and stylization(s) or style codes, may be inputted into the generator to result in the generation of either raw feature three-dimensional image or a stylized three-dimensional image.

In an example embodiment, the decoder 350 may be configured by including functions, operations, actions, algorithms, an application, or the like to synthesize the raw feature images from the style conditioned three-dimensional generator 340 to synthesize the final three-dimensional stylized portrait of the input data, e.g., including color, e.g., RGB. The decoder 350 may also be configured by including functions, operations, actions, algorithms, an application, or the like to synthesize the raw feature images from the three-dimensional generator 345 to synthesize the final three-dimensional image of the input data, e.g., including color, e.g., RGB. The decoder 350 may include a volume rendering module configured to transform synthesized images from the style conditioned three-dimensional generator 340 into a three-dimensional view, a super resolution module configured to synthesize the final RGB image by enhancing and/or increasing the resolution of the image, and/or an up-sampling module configured to process or enhance the original image to increase the spatial resolution of the image. It is appreciated that in an embodiment, the up-sampling module can be part of the super resolution module. It is appreciated that while FIG. 1 illustrates two decoders 350, a single decoder 350 may be used in the system 300.

In an example embodiment, style prior generator 370 may be a two-dimensional generator neural network, for example, based on StyleGAN2®. The style prior generator 370 may include functions, operations, actions, algorithms, an application, or the like. The style prior generator 370 may be configured to receive the input data 312 and generate style conditioned two-dimensional representations of the input data. The style prior generator 370 may also be configured to generate numerous real portrait images, e.g., any widely accessible real portrait images, into augmented stylized two-dimensional portrait image samples. The style prior generator 370 may be the style prior generator 270 of FIG. 2.

In an example embodiment, discriminator 380 may include a dual discriminator neural network for supervising the training, conditioning, and/or tuning of the style conditioned three-dimensional generator 340 via a guided transfer learning process with the style prior generator 370, e.g., to tune the weights of the style conditioned three-dimensional generator 340 to adapt to the domain of the style exemplars, e.g., stylization(s). The discriminator 380 may include functions, operations, actions, algorithms, an application, or the like. The discriminator 380 may be configured to use adversarial loss to tune the style conditioned three-dimensional generator 340 by comparing a distribution of translated images of the three-dimensional stylized portraits from the style conditioned three-dimensional generator 340 to a distribution of the two-dimensional stylized portraits generated by the style prior generator 370, e.g., of training data.

Referring back to FIG. 3, the training, conditioning, and/or tuning of the style conditioned three-dimensional generator 340 may be implemented using a guided style transfer learning process in which the style prior generator 370 may be used. For example, in an embodiment, the style prior generator 370 may sample from the prior latent space to get an infinite amount of high-quality diverse stylized images for the guided transfer learning process, e.g., by sampling the latent code z. As such, the discriminator 380, e.g., a dual discriminator, may use adversarial loss to discriminate between images generated by the style prior generator 370 to fine-tune a pre-trained efficient geometry-aware three-dimensional generator, e.g., 340 or 345 or EG3D, with respect to $\phi$ (to produce or create the style conditioned three-dimensional generator 340) to generate or synthesize stylized three-dimensional portraits by matching the distribution of the translated images to the style prior distribution, e.g., of training data:

$$\mathcal{L}_{prior} = \mathbb{E}_{z_s \sim N(0,I)}[\min(0, -1 + D(S_t(z_s), p))] +$$
$$\mathbb{E}_{z \sim N(0,I)}\left[\min\left(0, -1 - D\left(\mathcal{G}_\phi(z, p), p\right)\right)\right]$$

where the latent code $z_s$ and z are from the two-dimensional GAN and three-dimensionally aware GAN latent spaces, respectively. In an embodiment, regularization terms may also be applied for stable fine-tuning. In another embodiment, a regression technique may be used for the discriminator 380 that shrinks or regularizes or constrains the coefficient estimates towards 0, e.g., $R_1$ path regularization.

Figure 4:
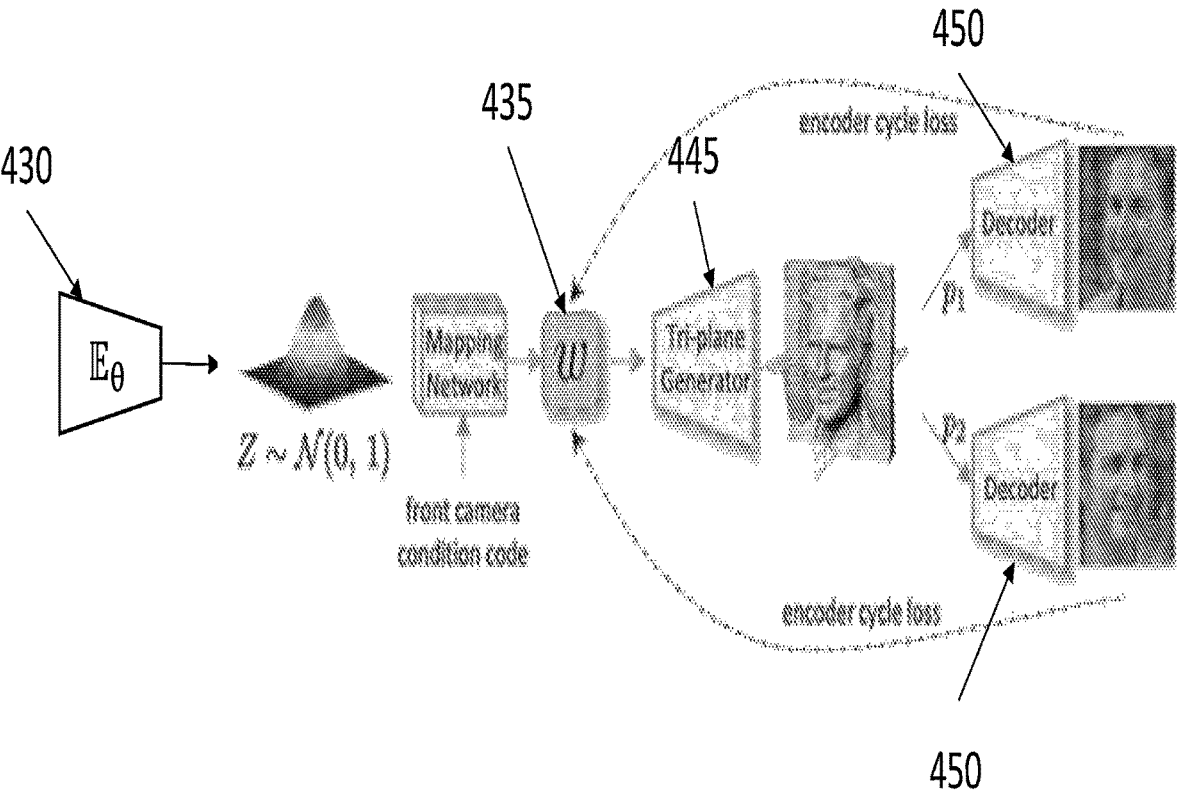
FIG. 4 illustrates training, conditioning, and/or tuning of an encoder of an example multi-dimensional model that may be implemented, arranged in accordance with at least some embodiments described herein.

Referring back to FIG. 3 and as seen in FIG. 4, in an example embodiment, the training or conditioning of the three-dimensional generative model 320 may also include the three-dimensional GAN inversion stage for inverting the real face image, e.g., self-portrait or selfie, into the latent space for three-dimensional stylization. FIG. 4 illustrates training, conditioning, and/or tuning of an encoder of an example three-dimensional model that may be implemented, arranged in accordance with at least some embodiments described herein. The features of FIG. 4 may include the same or similar features as discussed above with respect to FIGS. 1 and 3.

Initially, in an embodiment, the three-dimensional generative model 320 may be based on a pre-trained efficient geometry-aware three-dimensional generative adversarial network model, e.g., EG3D, that may include two latent spaces: the original latent space Z under a Gaussian distribution, and a less entangled W space via a mapping network from z with a conditional camera pose label p. The W space may be used for image embedding, and may be augmented into a W space that significantly increases the model expressiveness, e.g., by including additional layers. In contrast to modulating the convolutional kernels with a same code w, W$^+$ produces a different w latent code for each layer, allowing for individual attribute control. In an embodiment, the w+ in the W' space may have a dimension of 17×512, which can be represented as 17 $w_i$ codes, where the $w_0, \ldots, w_{13}$ codes may be for tri-plane generation, and $w_{14}, \ldots, w_{16}$ may be used in a super resolution module. It is appreciated that while the W$^+$ space is defined as having a dimension of 17×512 such disclosure is not intended to limit the scope of the disclosure. Rather, it is understood that different number of layers may be used depending on the desired resolution and quality of the resulting three-dimensional feature representation.

In an embodiment, as seen in FIG. 4, the encoder 430 (or 130, 330) may be trained for image inversion for fast inference, with the expectation of preserving user features, e.g., user similarity. In an embodiment, the encoder 430 (or 130, 330) may utilize the hierarchy of a pyramid network to capture different levels of detail from different layers, e.g., a top-down pathway architecture with lateral connections. For example, the input image that is resized at 256×256 resolution may be passed through a headless pyramid network to produce three levels of feature maps at different sizes. Each level's feature map may then go through a separate sub-encoder block to produce the W' style code, e.g., the intermediate style code, for the W' latent space 435.

In an embodiment, the encoder 430 (or 130, 330) may be trained by the following. The three-dimensional generator 445 (or 345) may be configured to generate raw images of view consistent three-dimensional features of input data with well-preserved facial identities. In an embodiment, the latent code z, that determines the geometry and appearance of a subject, and a conditional camera pose p may be passed through a multi-layer perceptron mapping network to obtain an intermediate latent code w. The intermediate latent code w may then be duplicated multiple times to modulate the synthesis convolution layers to produce tri-plane features, e.g., three-dimensional features from planes extended in the depth direction. The raw features may then be sampled into a neural radiance field, e.g., NeRF, at the desired camera angle p and accumulated to generate a raw feature image via volumetric rendering. The raw features may also be upsampled using a super resolution module to synthesize the final three-dimensional images, e.g., in RGB.

By feeding the final three-dimensional images that are view consistent and have the well-preserved facial identities into the encoder 430 (or 130, 330), the encoder 430 (or 130, 330) may be trained for the image inversion using the pyramid network as discussed above. As such, the most accurate latent code to reconstruct the image and maintain image fidelity of the input data may be provided. Thus, the latent code for the W' latent space may be used to provide the intermediate latent code w as an input into the style conditioned three-dimensional generator 340 such that the stylized three-dimensional portrait of the input data may be synthesized or generated that not only includes the desired stylization, but also has view consistent three-dimensional features with well-preserved facial identities, e.g., user similarity.

Furthermore, as illustrated in FIG. 4, to prevent the encoder 430 (or 130, 330) from over-drifting from the representation domain of the three-dimensional generator $\mathcal{G}_\phi$ 445, a multi-view cycle consistent loss may be used. In an embodiment, the encoder 430 (or 130, 330) may be configured to reproduce the latent code from a synthesized image conditioned on w but rendered from arbitrary views, e.g., arbitrary camera poses. Specifically, a collection of latent codes may be randomly sampled under the standard Gaussian distribution Z, and together with a fixed frontal camera pose, fed into the mapping network, e.g., MLP, to obtain intermediate latent code w samples that are complied with the original distribution to synthesize high-quality images without artifacts. By training the encoder 430 (or 130, 330) with the in-domain samples, the output intermediate code w+ may be prevented from drifting far-away from the W space. The images may then be synthesized by the three-dimensional generator 445 with N random camera poses p1, p2, . . . , pi from a training dataset camera distribution and used to supervise the training of $\varepsilon_\theta$ with ground-truth w+ labels, as defined by:

$$\mathcal{L}_{cyc} = \sum_{i=1}^{N} \mathcal{L}_2\left(w^+, \varepsilon_\theta\left(\mathcal{G}_\phi(w, p_i)\right)\right)$$

In an embodiment, in addition to the multi-view cycle consistent loss, the encoder 430 may also be trained with reconstruction losses and regularization losses in a weighted combination manner, while freezing the weights of the three-dimensional generator 445. For example, in an embodiment, x may be the input image, passed through an encoder 430 and decoder 450 to yield $\hat{x}=\mathcal{G}_\phi(\varepsilon_\theta(x))$, such that the reconstruction loss may be defined by:

$$\mathcal{L}_{rec} = \mathcal{L}_2(x, \hat{x}) + \mathcal{L}_{lpips}(x, \hat{x}) + \mathcal{L}_{arc}(x, \hat{x})$$

Where the $\mathcal{L}_2$, $\mathcal{L}_{lpips}$, $\mathcal{L}_{arc}$ respectively measure the pixel-level, perceptual-level similarities and facial recognition level similarity differences. $\mathcal{L}_{arc}$ may be based on the cosine similarity between intermediate features extracted from a pre-trained recognition network that evaluates the identity similarity, e.g., by taking two face images as inputs and outputs the distance between them using a similarity learning mechanism that allows distance metric learning, e.g., ArcFace.

In an example embodiment, a regularization term may further be introduced to reduce the divergence of the intermediate w+ code to mimic the origin W space for the best image quality, as defined by:

$$\mathcal{L}_{reg} = \|div(\varepsilon_\theta(x))\|_2$$

Referring back to FIG. 3, in an example embodiment, the training, conditioning, and/or tuning of the three-dimensional generative model 320 may also include a guided transfer learning stage to further improve the three-dimensional stylization quality, especially for cases where the inverted codes might not be well aligned with the original distribution, such that the stylized images may contain artifacts, such as blurriness. For example, in an example embodiment, the guided transfer learning stage is provided by combining fine-tuning and inversion to enlarge the transfer learning space from the Z space to the W' space, which has stronger generative stylization capability, e.g., more expressiveness since each layer uses different latent codes. For example, in an embodiment, since during the style prior generation stage, the realistic images (e.g., 274) may be paired with the stylized image (e.g., 276), paired data may be produced to guide the transfer learning of the style conditioned three-dimensional generator (e.g., 140, 340)

with the reconstruction loss. In an example embodiment, given a real image x with estimated camera pose p and its two-dimensional stylized pair $x_s$, let $\hat{x}_s=\mathcal{G}_\phi(\varepsilon_\theta(x), p)$, such that:

$$\mathcal{L}_{guide} = \mathcal{L}_2(x_s, \hat{x}_s) + \mathcal{L}_{lpips}(x_s, \hat{x}_s)$$

Where $\mathcal{L}_{guide}$ is the guidance loss. It is appreciated that the guidance loss may be used to help stabilize the training of the style conditioned three-dimensional generator (e.g., 140, 440), and also improve the generative quality and user similarity of the style conditioned three-dimensional generator (e.g., 140, 440). In an embodiment, the guidance loss may be used to fine-tune the style conditioned three-dimensional generator (e.g., 140, 440) and dual discriminator (e.g., 380) by freezing the weights or parameters of the encoder (e.g., 130, 330) and style prior generator (e.g., 270, 370).

Figure 5:
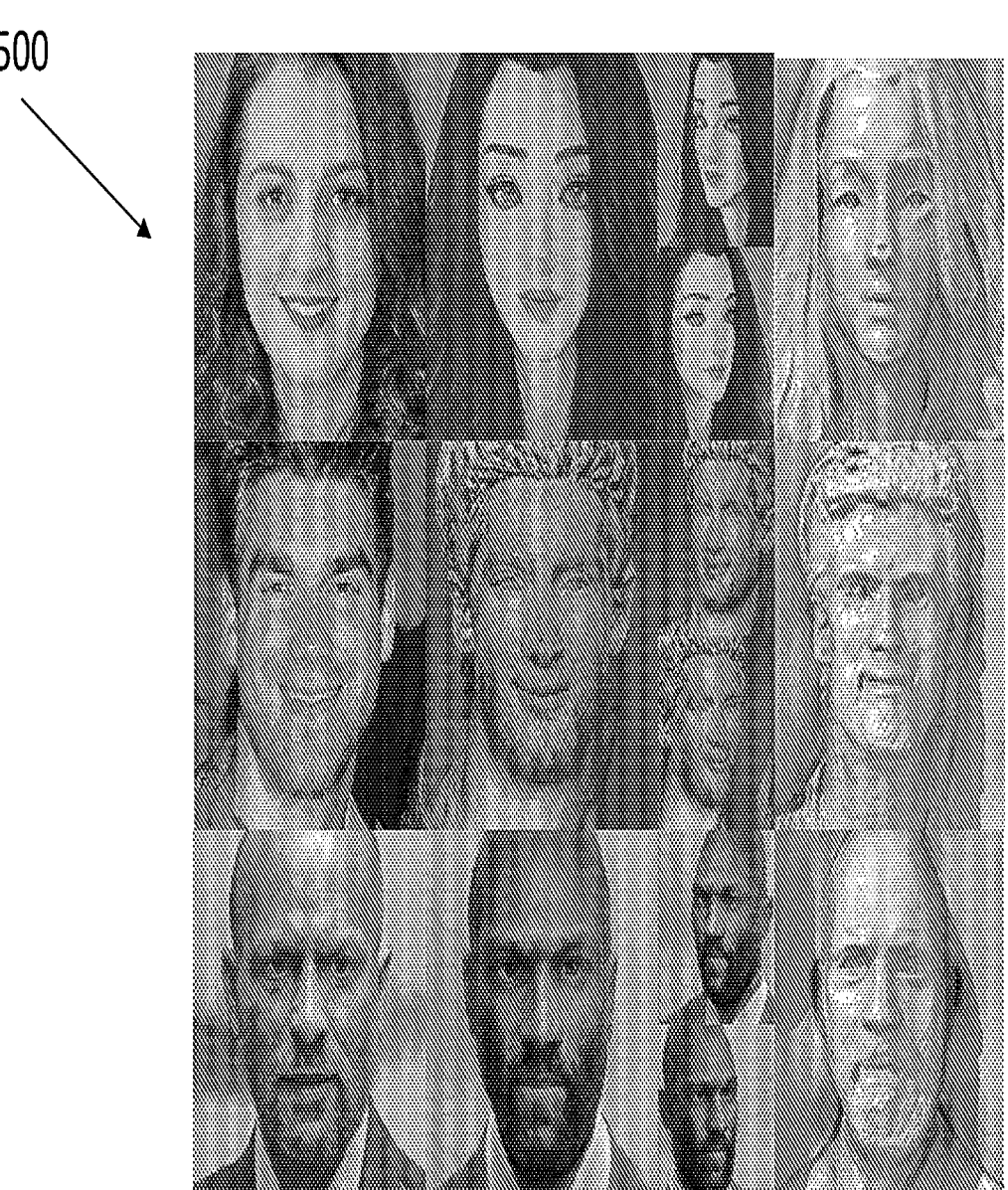
FIG. 5 illustrates example representations of three-dimensional stylized images synthesized from a multi-dimensional model, arranged in accordance with at least some embodiments described herein.

FIG. 5 illustrates an example 500 that includes inputs and outputs of the three-dimensional generative model (e.g., 120 of FIG. 1 or 320 of FIG. 3), arranged in accordance with at least some embodiments described herein.

FIG. 5 illustrates that the three-dimensional generative model described herein may provide view-consistent three-dimensional image synthesis with high-fidelity geometry and stylization, enabling stylized three-dimensional portraits creation from a single-view image, e.g., self-portrait or selfie, while maintaining user identity, e.g., user similarity. The first column of FIG. 5 illustrates the input data, e.g., the single-view image, and the remaining columns of FIG. 5 illustrate the stylized three-dimensional portraits from the input data that is output by the three-dimensional generative model. As such, the style conditioned three-dimensional generator may be tuned using a guided transfer learning process with the desired stylization, e.g., the artistic style, such as, anime, sculpture, or abstract, for the generation or synthesis of the stylized three-dimensional portrait which high-fidelity geometry that maintains user identity.

Figure 6:
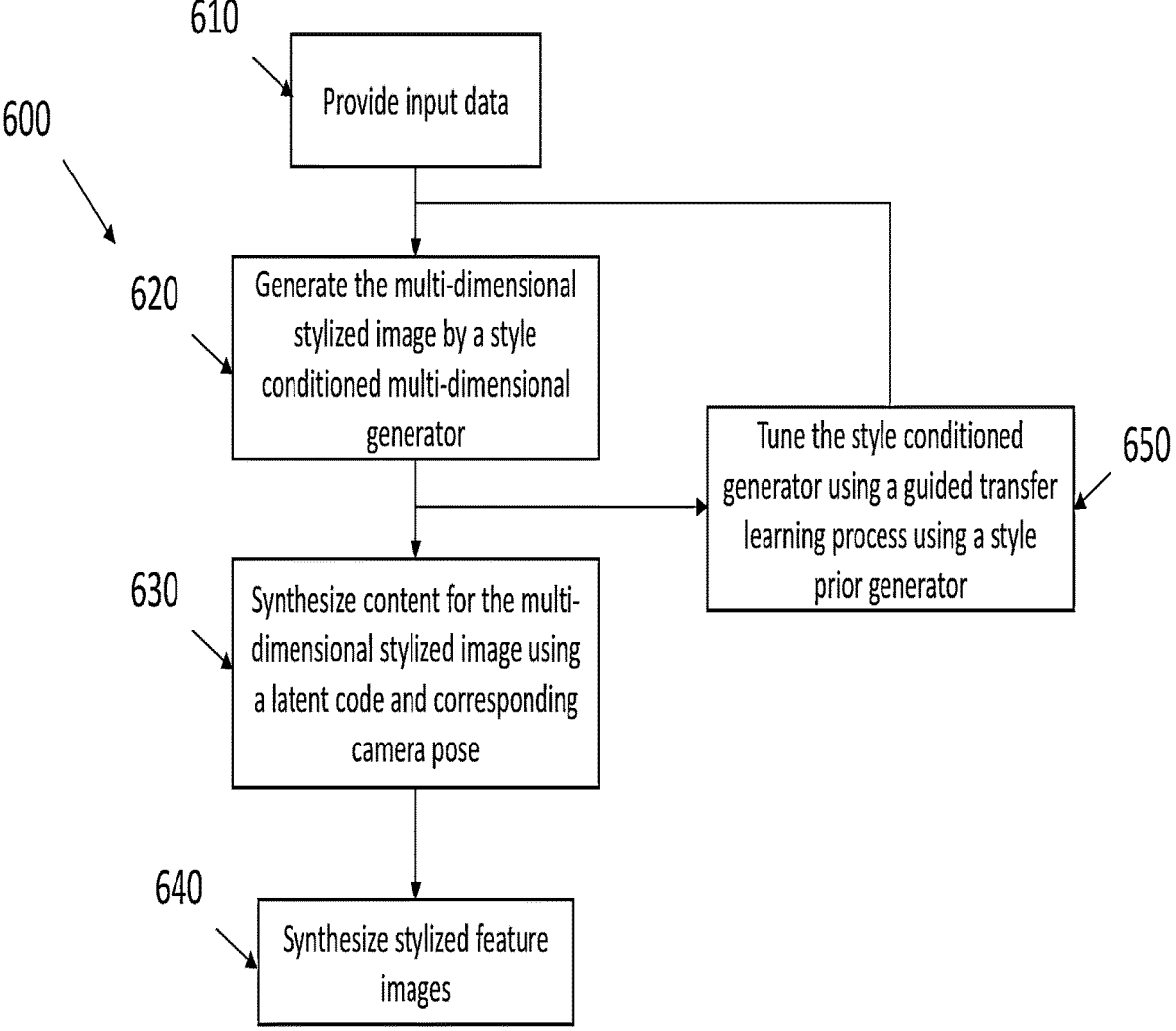
FIG. 6 illustrates a flow chart illustrating an example processing flow of a method for generating multi-dimensional stylized images, in accordance with at least some embodiments described herein.

FIG. 6 is a flow chart 600 illustrating an example processing flow of the three-dimensional generative model (e.g., 120 of FIG. 1 or 320 of FIG. 3), in accordance with at least some embodiments described herein.

It is to be understood that three-dimensional stylized portrait generation that has detailed geometry, stylization, and personalized results, e.g., user similarity, is difficult to synthesize, since the prior generation models require a large number of high quality three-dimensional image data and/or training data with well-conditioned camera pose. Additionally, in view of the large amount of training data to train the prior generation models, when a stylization is changed, e.g., from anime to sculptor, a large number of style exemplars would be needed to perform the stylization. To address such problems, the multi-dimensional generative model described herein provides a multi-dimensional generative model that may synthesize multi-dimensional stylized images, e.g., three-dimensional stylized portraits, with a single-view image, e.g., single selfie or self-portrait, by using transfer learning. As such, the multi-dimensional generative model described herein may generate multi-dimensional stylized images with detailed geometry in which new stylizations may be achieved with only a few unpaired style exemplars. In an embodiment, the transfer learning process uses a style prior generator to train, condition, and/or tune the multi-dimensional generative model to synthesize multi-view consistent stylized images in a wide range of artistic styles, e.g., stylizations. Additionally, the multi-dimensional generative model may provide a simple yet efficient way to fine-tune a pre-trained three-dimensional generative adversarial network (GAN) by using a style prior creation stage to improve data diversity which may be combined with guided transfer learning to increase the stylization domain coverage. Further, the multi-dimensional generative model may be trained such that the encoder is configured to invert the input data, e.g., real face image, into the corresponding latent space and trained with cycle consistent loss to improve identity preservation while achieving high stylization quality It is to be understood that the processing flow 600 disclosed herein can be conducted by one or more processors (e.g., the central processor unit 705 of FIG. 7 and/or any other suitable processor), unless otherwise specified.

It is also to be understood that the processing flow 600 can include one or more operations, actions, or functions as illustrated by one or more of blocks 610, 620, 630, 640 and 650. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 600 may begin at block 610 or 650.

At block 610, the processor may provide input data into a latent space for a style conditioned multi-dimensional generator of a multi-dimensional generative model. For example, the processor may use an encoder to embed an input image into an enlarged latent space, e.g., W latent space, using encoded latent codes, feature vectors corresponding to latent features into the latent space, in accordance with encoding technologies, i.e., extracted or mapped into the latent space. Non-limiting examples of extracted features may include surfaces, gender, skin color, lighting, coloring, identities, animals, objects, edges, points, boundaries, curves, shapes, etc. Processing may proceed from block 610 to block 620.

At block 620, the processor may perform generation of the multi-dimensional stylized image from the input data by the style conditioned multi-dimensional generator. For example, block 620 may proceed to block 630, in which the processor may perform synthesizing content for the multi-dimensional stylized image using a latent code and corresponding camera pose from the latent space to formulate an intermediate code to modulate synthesis convolution layers to generate feature images as multi-planar representations. In an embodiment, the processor may be configured such that the style conditioned three-dimensional generator may be configured to receive the feature vectors and/or the latent features of the input data from the latent space and generate style conditioned three-dimensional representations, e.g., stylized three-dimensional representations of the input data in a tri-plane or multi-grid space. Processing may proceed from block 630 to block 640.

At block 640, the processor may perform synthesizing stylized feature images of the feature images for generating the multi-dimensional stylized image of the input data. In an embodiment, processor may be configured such that the style conditioned three-dimensional generator may take the learned latent codes z, e.g., from a standard Gaussian distribution, that determines the geometry and appearance of the input data, and camera poses p corresponding to the latent code to synthesize the style conditioned three-dimensional representations. In an embodiment, the latent code z and the camera pose p may be passed though a mapping network, e.g., a multi-layer perceptron, to obtain an intermediate latent code w, which may be inputted and duplicated multiple times by the style conditioned three-dimensional generator to modulate synthesis convolution layers to produce the stylized three-dimensional features, e.g., mapped in a tri-plane or the like.

In order to provide the stylization of the three-dimensional portrait, the processing may include block 650 in which the processor may perform tuning of the style conditioned multi-dimensional generator using a guided transfer learning process using a style prior generator. The guided transfer learning process may include using a style prior generator to improve data diversity. In an embodiment, the processor may be configured to train, condition, and/or tune a style prior generator. The style prior generator may be based on a generative adversarial network (GAN) that is enhanced with a multi-path structure to better adapt to different stylization features. The GAN may be pre-trained on high-resolution real portraits, such that the GAN may be set having initialization weights to form realistic images. The style prior generator may be trained, conditioned, and/or tuned using a transfer learning process that is used to train, condition, and/or tune a two-dimensional GAN, e.g., Style-GAN2®, using a predetermined amount of style exemplars, e.g., 10, 15, 20, 25, 30, 35, or 40, having the desired stylization. For example, the stylizations from the style exemplars may be synthesized by directly up-sampling feature maps into images via several convolution layers. Since the two-dimensional GAN may have initially been configured as a pre-trained model for generating realistic images, e.g., trained on two-dimensional images, by having the stylizations, e.g., as feature maps, the two-dimensional GAN may then be trained, conditioned, and/or tuned to generate two-dimensional stylized images.

As such, the transfer learning process may be used to train or condition the two-dimensional GAN into a style prior generator with a few shot style exemplars. Such trained style prior generator may be configured to generate synthesized stylized two-dimensional images of widely accessible real portrait images, e.g., using the latent code(s), and is also allows the pairing of the stylized image with the real (or realistic) image such that camera pose labels may be obtained with a pose estimator, e.g., based on the camera pose from the real or realistic portrait image using a face recognition network or using facial landmarks.

The processor may then be configured to train, condition, and/or tune the style conditioned three-dimensional generator using a guided style transfer learning process in which the style prior generator may be used. For example, in an embodiment, the style prior generator may sample from the prior latent space to get an infinite amount of high-quality diverse stylized images for the guided transfer learning process, e.g., by sampling the latent code z. As such, a discriminator, e.g., a dual discriminator, may use adversarial loss to discriminate between images generated by the style prior generator to fine-tune a pre-trained efficient geometry-aware three-dimensional generator, e.g., EG3D, with respect to φ (to produce or create the style conditioned three-dimensional generator) to generate or synthesize stylized three-dimensional portraits by matching the distribution of the translated images to the style prior distribution, e.g., of training data:

$$\mathcal{L}_{prior} = \mathbb{E}_{z_s \sim N(0,I)}[\min(0, -1 + D(S_t(z_s), p))] +$$

$$\mathbb{E}_{z \sim N(0,I)}[\min(0, -1 - D(\mathcal{G}_{\phi}(z, p), p))]$$

where the latent code $z_s$ and $z$ are from the two-dimensional GAN and three-dimensionally aware GAN latent spaces, respectively. In an embodiment, regularization terms may also be applied for stable fine-tuning. In another embodiment, a regression technique may be used for the discriminator that shrinks or regularizes or constrains the coefficient estimates towards 0, e.g., $R_1$ path regularization.

Further, the processor may be configured to train, condition, and/or tune the three-dimensional generative model by using the guided transfer learning stage to further improve the three-dimensional stylization quality, especially for cases where the inverted codes might not be well aligned with the original distribution, such that the stylized images may contain artifacts, such as blurriness. For example, in an example embodiment, the guided transfer learning stage is provided by combining fine-tuning and inversion to enlarge the transfer learning space from the Z space to the $W^+$ space, which has stronger generative stylization capability, e.g., more expressiveness since each layer uses different latent codes. For example, in an embodiment, since during the style prior generation stage, the realistic images may be paired with the stylized image, paired data may be produced to guide the transfer learning of the style conditioned three-dimensional generator with the reconstruction loss. In an example embodiment, given a real image x with estimated camera pose p and its two-dimensional stylized pair $x_s$, let $\hat{x}_s = \mathcal{G}_{\phi}(\mathcal{E}_{\theta}(x), p)$, such that:

$$\mathcal{L}_{guide} = \mathcal{L}_2(x_s, \hat{x}_s) + \mathcal{L}_{lpips}(x_s, \hat{x}_s)$$

Where $\mathcal{L}_{guide}$ is the guidance loss. It is appreciated that the guidance loss may be used to help stabilize the training of the style conditioned three-dimensional generator, and also improve the generative quality and user similarity of the style conditioned three-dimensional generator. In an embodiment, the guidance loss may be used to fine-tune the style conditioned three-dimensional generator and dual discriminator by freezing the weights or parameters of the encoder and style prior generator.

Figure 7:
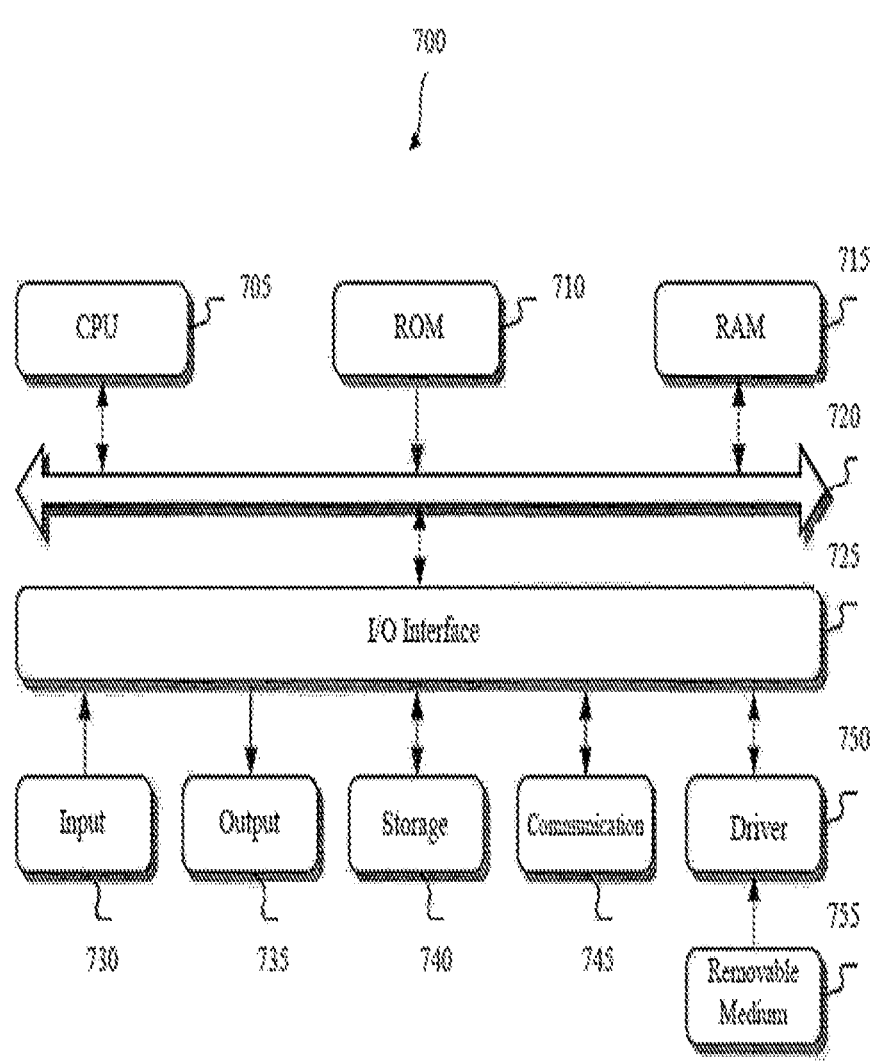
FIG. 7 is a schematic structural diagram of an example computer system applicable to implementing an electronic device, arranged in accordance with at least some embodiments described herein.

FIG. 7 is a schematic structural diagram of an example computer system 700 applicable to implementing an electronic device (for example, a GPU or CPU), arranged in accordance with at least some embodiments described herein. It is to be understood that the computer system shown in FIG. 7 is provided for illustration only instead of limiting the functions and applications of the embodiments described herein.

As depicted, the computer system 700 may include a central processing unit (CPU) 705. The CPU 705 may perform various operations and processing based on programs stored in a read-only memory (ROM) 710 or programs loaded from a storage device 740 to a random-access memory (RAM) 715. The RAM 715 may also store various data and programs required for operations of the system 700. The CPU 705, the ROM 710, and the RAM 715 may be connected to each other via a bus 720. An input/output (I/O) interface 725 may also be connected to the bus 720.

The components connected to the I/O interface 725 may further include an input device 730 including a keyboard, a mouse, a digital pen, a drawing pad, or the like; an output device 735 including a display such as a liquid crystal display (LCD), a speaker, or the like; a storage device 740 including a hard disk or the like; and a communication device 745 including a network interface card such as a LAN card, a modem, or the like. The communication device 745 may perform communication processing via a network such as the Internet, a WAN, a LAN, a LIN, a cloud, etc. In an embodiment, a driver 750 may also be connected to the I/O interface 725. A removable medium 755 such as a magnetic disk, an optical disk, a magneto-optical disk, a semiconductor memory, or the like may be mounted on the driver 750 as desired, such that a computer program read from the removable medium 755 may be installed in the storage device 740.

As such, a multi-dimensional generative model may be provided that may synthesize multi-view consistent images that are stylized based on a few shot style exemplars. That is, the multi-dimensional generative model may be provided such that three-dimensional stylized images, e.g., portraits, with detailed geometry may be synthesized given only a single user photo as input data in which a new stylization may be achieved with only a few unpaired style exemplars, e.g., 20. Additionally, the multi-dimensional generative model may provide a simple yet efficient way to fine-tune a pre-trained three-dimensional generative adversarial network (GAN) by using a style prior creation stage to improve data diversity which may be combined with guided transfer learning to increase the stylization domain coverage. Further, the multi-dimensional generative model may be trained such that the encoder is configured to invert the input data, e.g., real face image, into the corresponding latent space and trained with cycle consistent loss to improve identity preservation while achieving high stylization quality.

Thus, the multi-dimensional generative model is configured to leverage two-dimensional stylization capabilities, e.g., style prior creation, to produce a large amount of augmented two-dimensional style exemplars such that the limited two-dimensional style exemplars, e.g., few shot style exemplars, may be augmented in order to supply downstream three-dimensional GAN transfer learning with sufficient training data with well-estimated camera labels. Additionally, the multi-dimensional generative model is trained such that the encoder is configured to map input images into the latent space, e.g., W, which well preserves facial identities with a multi-view cycle consistent loss. Further, the multi-dimensional generative model is trained to further improve the stylization quality, by using guided transfer learning to remove out-of-domain stylization artifacts.

It is to be understood that the disclosed and other solutions, examples, embodiments, modules and the functional operations described in this document may be implemented in digital electronic circuitry, or in computer software, firmware, or hardware, including the structures disclosed in this document and their structural equivalents, or in combinations of one or more of them. The disclosed and other embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this document may be performed by one or more programmable processors executing one or more computer programs to perform functions by operating on input data and generating output. The processes and logic flows may also be performed by, and apparatus may also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; and magneto optical disks. The processor and the memory may be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of the aspects may be combined with each other.

Aspect 1. A method for generating a multi-dimensional stylized image, the method comprising: providing input data into a latent space for a style conditioned multi-dimensional generator of a multi-dimensional generative model; generating the multi-dimensional stylized image from the input data by the style conditioned multi-dimensional generator by: synthesizing content for the multi-dimensional stylized image using a latent code and corresponding camera pose from the latent space to formulate an intermediate code to modulate synthesis convolution layers to generate feature images as multi-planar representations; synthesizing stylized feature images of the feature images for generating the multi-dimensional stylized image of the input data, wherein the style conditioned multi-dimensional generator is tuned using a guided transfer learning process using a style prior generator.

Aspect 2. The method of Aspect 1, wherein the guided transfer learning process includes: generating two-dimensional stylized images of training data using the style prior generator; generating the multi-dimensional stylized images of the training data using the style conditioned multi-dimensional generator; discriminating the two-dimensional stylized images and the multi-dimensional stylized images using a discriminator that compares a distribution of translated images of the multi-dimensional stylized images to a distribution of the two-dimensional stylized images to tune the style conditioned multi-dimensional generator to generate the stylized feature images.

Aspect 3. The method of any of Aspects 1-2, wherein the feature images are further sampled into a neural radiance field at predetermined camera poses and accumulated to synthesize generation of raw feature images using volume rendering.

Aspect 4. The method of Aspect 3, further comprising upsampling the volume rendered feature images, wherein the upsampling includes refining the volume rendered feature images using a super resolution module to synthesize RGB images of the multi-dimensional stylized image.

Aspect 5. The method of any of Aspects 1-4, wherein the latent code and corresponding camera pose are passed through a mapping network to formulate the intermediate code.

Aspect 6. The method of any of Aspects 1-5, wherein the style prior generator is a two-dimensional generator trained on style exemplars having a stylization and configured to generate stylized two-dimensional images of realistic images.

Aspect 7. The method of Aspect 6, wherein the style prior generator is conditioned using a transfer learning process using a predetermined amount of style exemplars by synthesizing the style exemplars into feature maps having the stylization, wherein the predetermined amount of style exemplars is between 10 and 20.

Aspect 8. The method of Aspect 6, wherein during the transfer learning process realistic images are used, wherein camera poses are determined from the realistic images.

Aspect 9. The method of Aspect 6, wherein the stylization is an artistic style selected from the group consisting of cartoon, oil painting, cubism, abstract, comic, Sam Yang, sculpture, and anime.

Aspect 10. The method of any of Aspects 1-9, wherein the providing the input data includes inverting the input data using an encoder that outputs latent codes, wherein the style conditioned multi-dimensional generator is configured to generate the multi-planar representations using the encoded intermediate latent code.

Aspect 11. The method of Aspect 10, wherein the encoder is trained by: randomly sampling a plurality of latent codes from a Gaussian-distributed latent space with a fixed front camera pose, feeding the plurality of latent codes and the fixed front camera pose into a mapping network to obtain intermediate latent code samples, training the encoder with the obtained intermediate latent code samples to encode intermediate latent codes.

Aspect 12. The method of any of Aspects 1-11, wherein the multi-dimensional stylized image is a three-dimensional stylized portrait image and the input data is a self-portrait image.

Aspect 13. A multi-dimensional generative adversarial network (GAN), the GAN comprising: an encoder for inverting input data into a latent space; a style conditioned multi-dimensional generator; and a style prior generator, wherein the style conditioned multi-dimensional generator is configured to: synthesize content for a multi-dimensional stylized image using a latent code and corresponding camera pose from the latent space to formulate an intermediate code to modulate synthesis convolution layers to generate feature images as multi-planar representations; synthesize stylized feature images of the feature images as the multi-planar representations to generate the multi-dimensional stylized image of the input data, wherein the style conditioned multi-dimensional generator is tuned using a guided transfer learning process using the style prior generator.

Aspect 14. The GAN of Aspect 13, further comprising a decoder, the decoder including a super resolution module to synthesize RGB images of the multi-dimensional stylized image.

Aspect 15. The GAN of any of Aspects 13-14, further comprising a discriminator, wherein the style prior generator is configured to generate two-dimensional stylized images of training data and the discriminator is configured to discriminate between a distribution of the two-dimensional stylized images from the style prior generator and a distribution of translated images of multi-dimensional stylized images of the training data from the style conditioned multi-dimensional generator to tune the style conditioned multi-dimensional generator.

Aspect 16. The GAN of Aspect 15, wherein the style prior generator is a two-dimensional generator trained on style exemplars having a stylization and configured to generate stylized two-dimensional images of realistic images.

Aspect 17. The GAN of Aspect 16, wherein the stylization is an artistic style selected from the group consisting of cartoon, oil painting, cubism, abstract, comic, Sam Yang, sculpture, and anime.

Aspect 18. The GAN of any of Aspects 13-17, wherein the multi-dimensional stylized image is a three-dimensional stylized portrait image and the input data is a self-portrait image.

Aspect 19. A non-transitory computer-readable medium having computer-executable instructions stored thereon that, upon execution, cause one or more processors to perform operations comprising: providing input data into a latent space for a style conditioned multi-dimensional generator of a multi-dimensional generative model; generating the multi-dimensional stylized image from the input data by the style conditioned multi-dimensional generator by: synthesizing content for the multi-dimensional stylized image using a latent code and corresponding camera pose from the latent space to formulate an intermediate code to modulate synthesis convolution layers to generate feature images as multi-planar representations; synthesizing stylized feature images of the feature images for generating the multi-dimensional stylized image of the input data, wherein the style conditioned multi-dimensional generator is tuned using a guided transfer learning process using a style prior generator.

Aspect 20. The non-transitory computer-readable medium according to Aspect 19, wherein the computer-executable operations further includes: generating two-dimensional stylized images of training data using the style prior generator; generating the multi-dimensional stylized images of the training data using the style conditioned multi-dimensional generator; discriminating the two-dimensional stylized images and the multi-dimensional stylized images using a discriminator that compares a distribution of translated images of the multi-dimensional stylized images to a distribution of the two-dimensional stylized images to tune the style conditioned multi-dimensional generator to generate the stylized feature images.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for generating a multi-dimensional stylized image, the method comprising:

providing input data into a latent space for a style conditioned multi-dimensional generator of a multi-dimensional generative model; and generating the multi-dimensional stylized image from the input data by the style conditioned multi-dimensional generator by:

synthesizing content for the multi-dimensional stylized image using a latent code and corresponding camera pose from the latent space to formulate an intermediate code to modulate synthesis convolution layers to generate feature images as multi-planar representations; and synthesizing stylized feature images of the feature images for generating the multi-dimensional stylized image of the input data, wherein the style conditioned multi-dimensional generator is tuned using a guided transfer learning process using a style prior generator, wherein the style prior generator is a two-dimensional generator trained on style exemplars having a stylization and configured to generated stylized two-dimensional images of realistic images, and wherein the style prior generator is conditioned using a transfer learning process using a predetermined amount of style exemplars by synthesizing the style exemplars into feature maps having the stylization, wherein the predetermined amount of style exemplars is 10 or more.

2. The method of claim 1, wherein the guided transfer learning process includes:

generating two-dimensional stylized images of training data using the style prior generator;

generating the multi-dimensional stylized images of the training data using the style conditioned multi-dimensional generator; and discriminating the two-dimensional stylized images and the multi-dimensional stylized images using a discriminator that compares a distribution of translated images of the multi-dimensional stylized images to a distribution of the two-dimensional stylized images to tune the style conditioned multi-dimensional generator to generate the stylized feature images.

3. The method of claim 1, wherein the feature images are further sampled into a neural radiance field at predetermined camera poses and accumulated to synthesize generation of raw feature images using volume rendering.

4. The method of claim 3, further comprising upsampling the volume rendered feature images, wherein the upsampling includes refining the volume rendered feature images using a super resolution module to synthesize RGB images of the multi-dimensional stylized image.

5. The method of claim 1, wherein the latent code and corresponding camera pose are passed through a mapping network to formulate the intermediate code.

6. The method of claim 1, wherein the predetermined amount of style exemplars is between 10 and 20.

7. The method of claim 1, wherein during the transfer learning process realistic images are used, wherein camera poses are determined from the realistic images.

8. The method of claim 1, wherein the stylization is an artistic style selected from the group consisting of cartoon, oil painting, cubism, abstract, comic, Sam Yang, sculpture, and anime.

9. The method of claim 1, wherein the providing the input data includes inverting the input data using an encoder that outputs latent codes, wherein the style conditioned multi-dimensional generator is configured to generate the multi-planar representations using the encoded intermediate latent code.

10. The method of claim 9, wherein the encoder is trained by:

randomly sampling a plurality of latent codes from a Gaussian-distributed latent space with a fixed front camera pose, feeding the plurality of latent codes and the fixed front camera pose into a mapping network to obtain intermediate latent code samples, training the encoder with the obtained intermediate latent code samples to encode intermediate latent codes.

11. The method of claim 1, wherein the multi-dimensional stylized image is a three-dimensional stylized portrait image and the input data is a self-portrait image.

12. A computing system comprising:

one or more processors; and one or more computer-readable media having computer-executable instructions stored thereon that, upon execution, cause the one or more processors to implement a multi-dimensional generative adversarial network (GAN), the GAN comprising:

an encoder for inverting input data into a latent space;

a style conditioned multi-dimensional generator; and a style prior generator, wherein the style conditioned multi-dimensional generator is configured to:

synthesize content for a multi-dimensional stylized image using a latent code and corresponding camera pose from the latent space to formulate an intermediate code to modulate synthesis convolution layers to generate feature images as multi-planar representations;

synthesize stylized feature images of the feature images as the multi-planar representations to generate the multi-dimensional stylized image of the input data, wherein the style conditioned multi-dimensional generator is tuned using a guided transfer learning process using the style prior generator, wherein the style prior generator is a two-dimensional generator trained on style exemplars having a stylization and configured to generated stylized two-dimensional images of realistic images, and wherein the style prior generator is conditioned using a transfer learning process using a predetermined amount of style exemplars by synthesizing the style exemplars into feature maps having the stylization, wherein the predetermined amount of style exemplars is 10 or more.

13. The computing system of claim 12, further comprising a decoder, the decoder including a super resolution module to synthesize RGB images of the multi-dimensional stylized image.

14. The computing system of claim 12, further comprising a discriminator, wherein the style prior generator is configured to generate two-dimensional stylized images of training data and the discriminator is configured to discriminate between a distribution of the two-dimensional stylized images from the style prior generator and a distribution of translated images of multi-dimensional stylized images of the training data from the style conditioned multi-dimensional generator to tune the style conditioned multi-dimensional generator.

15. The computing system of claim 14, wherein the style prior generator is a two-dimensional generator trained on style exemplars having a stylization and configured to generate stylized two-dimensional images of realistic images.

16. The computing system of claim 15, wherein the stylization is an artistic style selected from the group consisting of cartoon, oil painting, cubism, abstract, comic, Sam Yang, sculpture, and anime.

17. The computing system of claim 12, wherein the multi-dimensional stylized image is a three-dimensional stylized portrait image and the input data is a self-portrait image.

18. A non-transitory computer-readable medium having computer-executable instructions stored thereon that, upon execution, cause one or more processors to perform operations comprising:

providing input data into a latent space for a style conditioned multi-dimensional generator of a multi-dimensional generative model; and generating a multi-dimensional stylized image from the input data by the style conditioned multi-dimensional generator by:

synthesizing content for the multi-dimensional stylized image using a latent code and corresponding camera pose from the latent space to formulate an intermediate code to modulate synthesis convolution layers to generate feature images as multi-planar representations;

synthesizing stylized feature images of the feature images for generating the multi-dimensional stylized image of the input data, wherein the style conditioned multi-dimensional generator is tuned using a guided transfer learning process using a style prior generator, wherein the style prior generator is a two-dimensional generator trained on style exemplars having a stylization and configured to generated stylized two-dimensional images of realistic images, and wherein the style prior generator is conditioned using a transfer learning process using a predetermined amount of style exemplars by synthesizing the style exemplars into feature maps having the stylization, wherein the predetermined amount of style exemplars is 10 or more.

19. The non-transitory computer-readable medium according to claim 18, wherein the operations further include:

generating two-dimensional stylized images of training data using the style prior generator;

generating the multi-dimensional stylized images of the training data using the style conditioned multi-dimensional generator; and discriminating the two-dimensional stylized images and the multi-dimensional stylized images using a discriminator that compares a distribution of translated images of the multi-dimensional stylized images to a distribution of the two-dimensional stylized images to tune the style conditioned multi-dimensional generator to generate the stylized feature images.

* * * * *